United States Patent
Huang (10) Patent No.: US 12,438,811 B2
(45) Date of Patent: Oct. 7, 2025

(54) SERVICE TRAFFIC PROCESSING METHOD AND APPARATUS

(71) Applicant: ZTE Corporation, Shenzhen (CN)

(72) Inventor: Guangping Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 424 days.

(21) Appl. No.: 18/015,109

(22) PCT Filed: May 17, 2021

(86) PCT No.: PCT/CN2021/094172
§ 371 (c)(1),
(2) Date: Jan. 9, 2023

(87) PCT Pub. No.: WO2022/007503
PCT Pub. Date: Jan. 13, 2022

(65) Prior Publication Data
US 2023/0275834 A1    Aug. 31, 2023

(30) Foreign Application Priority Data

Jul. 10, 2020  (CN) .................. 202010664407.X (51) Int. Cl.
*H04L 45/745* (2022.01)
*H04L 45/76* (2022.01)
*H04L 69/22* (2022.01)

(52) U.S. Cl.
CPC ............ *H04L 45/745* (2013.01); *H04L 45/76* (2022.05); *H04L 69/22* (2013.01)

(58) Field of Classification Search
CPC ....... H04L 45/745; H04L 45/76; H04L 45/38; H04L 45/306; H04L 45/64; H04L 45/34; H04L 67/02; H04L 67/59; H04L 69/22
(Continued)

(56) References Cited

U.S. PATENT DOCUMENTS

| | | | |
|---|---|---|---|
| 2017/0237648 A1* | 8/2017 | Nakagawa | H04L 45/306 370/392 |
| 2018/0091420 A1* | 3/2018 | Drake | H04L 45/64 |

(Continued)

FOREIGN PATENT DOCUMENTS

| | | |
|---|---|---|
| CN | 107046506 A | 8/2017 |
| CN | 107409089 A | 11/2017 |

(Continued)

OTHER PUBLICATIONS

International Search Report for corresponding application PCT/CN2021/094172 filed May 17, 2021; Mail dated Aug. 24, 2021.
(Continued)

*Primary Examiner* — Jungwon Chang
(74) *Attorney, Agent, or Firm* — CANTOR COLBURN LLP (57) ABSTRACT

Provided are a service traffic processing method and apparatus. The method includes: receiving service traffic of a service function chain (SFC) computing network; determining an atomic function identifier of the service traffic; determining, according to a pre-stored SFC forwarding table, a first atomic function instance corresponding to the atomic function identifier, wherein the SFC forwarding table comprises a mapping relationship between an atomic function identifier and a plurality of equivalent atomic function instances; and forwarding the service traffic to the first atomic function instance, wherein the first atomic function instance is used for processing the service traffic.

18 Claims, 6 Drawing Sheets

(58) Field of Classification Search
USPC .......................................................... 370/392
See application file for complete search history.

(56) References Cited

U.S. PATENT DOCUMENTS

| | | | | |
|---|---|---|---|---|
| 2018/0227226 A1* | 8/2018 | Lu | ............................ | H04L 45/38 |
| 2018/0295053 A1* | 10/2018 | Leung | ...................... | H04L 67/59 |
| 2019/0140863 A1* | 5/2019 | Nainar | ..................... | H04L 45/34 |
| 2019/0230005 A1* | 7/2019 | Ao | .......................... | H04L 61/30 |
| 2020/0244722 A1* | 7/2020 | Jeuk | ....................... | H04W 4/029 |

FOREIGN PATENT DOCUMENTS

| | | | |
|---|---|---|---|
| CN | 112491739 | A | 3/2021 |
| CN | 112751826 | A | 5/2021 |
| WO | 2018000443 | A1 | 1/2018 |
| WO | 2019222703 | A1 | 11/2019 |

OTHER PUBLICATIONS

European Search Report for corresponding application EP21834714; Report dated Oct. 24, 2023.
Trossen Interdigital, et al., name-Based Service Function Forwarder (NsFF) component within SFC framework: May 27, 2019, pp. 1-29, XP015133092.

* cited by examiner

SERVICE TRAFFIC PROCESSING METHOD AND APPARATUS

CROSS-REFERENCE TO RELATED APPLICATION

The present disclosure claims priority to Chinese Patent Application No. CN202010664407.X, filed on Jul. 10, 2020, and entitled "Service Traffic Processing Method and Apparatus", the disclosure of which is hereby incorporated by reference in its entirety.

TECHNICAL FIELD

The embodiments of the present disclosure relate to the field of communications, and in particular, to a service traffic processing method and apparatus.

BACKGROUND

As the high-bandwidth and low-latency services such as videos, games and Internet of vehicles develop rapidly, and take up an increasingly higher proportion in service traffic, computing power and storage resources begin to evolve from traditional centralized deployment to distributed deployment. Computing power resources of a terminal, an edge node and a cloud node are connected by a network, and service traffic is scheduled collaboratively with the network, that is, the service traffic is routed to a currently optimal computing power node for processing, which has received increasingly higher attention from the industry. The service traffic is routed according to different service requirements to corresponding computing power nodes for processing, which will be a mainstream service scenario and service requirement of a computing network.

In a computing network, the network needs to perform a routing decision-making on service traffic according to distributed computing power resources, that is, a service is routed to a currently optimal computing power node for processing, so that the pooling advantages of distributed computing power resources are exploited, the utilization rate of the computing power resources is improved, and the computing power and network requirements of the service are satisfied in a precise and high-quality manner.

Compared with the current network, especially the layer-2 and layer-3 network, the granularity of forwarding processing is a message or a type flow, and corresponding bandwidth, queue and cache resources are configured therefor. The processing objects of node computing power resources in the computing network are not messages and flows but applications, which results in that the current network messages and flow processing mechanisms are no longer applicable to the computing network.

SUMMARY

The embodiments of the present disclosure provide a service traffic processing method and apparatus, so as to at least solve the problem that current network messages and flow processing mechanisms are not applicable to a computing network due to the situation in the related art where a current SF is bound to a network L2 or L3 address, while in a computing network, a computing power SF is highly dynamic, and the same SF corresponds to a plurality of atomic function instances.

According to an embodiment of the present disclosure, provided is a service traffic processing method, applied to a service function forwarder (SFF), comprising:
  receiving service traffic of a service function chain (SFC) computing network;
  determining an atomic function identifier of the service traffic;
  determining, according to a pre-stored SFC forwarding table, a first atomic function instance corresponding to the atomic function identifier, wherein the SFC forwarding table comprises a mapping relationship between an atomic function identifier and a plurality of atomic function instances; and
  forwarding the service traffic to the first atomic function instance, wherein the first atomic function instance is used for processing the service traffic.

In an embodiment, determining an atomic function identifier of the service traffic comprises: parsing a network service header (NSH) of the service traffic; and
  parsing out the atomic function identifier of a next atomic function instance according to a service path identifier (SPI) and a service index (SI).

In another embodiment, after forwarding the service traffic to the first atomic function instance, the method further comprises:
  receiving the service traffic returned by the atomic function instance after subtracting 1 from the SI;
  parsing a network service header (NSH) of the service traffic;
  parsing out a next atomic function identifier according to the SPI and the SI;
  determining, according to the pre-stored SFC forwarding table, a second atomic function instance corresponding to the next atomic function identifier; and
  forwarding the service traffic according to the second atomic function instance.

In another embodiment, forwarding the service traffic according to the second atomic function instance comprises:
  a first SFF determining an SFF corresponding to the second atomic function instance;
  in the case where the second atomic function instance corresponds to the first SFF, the first SFF locally forwarding the service traffic; and
  in the case where the second atomic function instance corresponds to a second SFF, the first SFF forwarding the service traffic to the second SFF.

In another embodiment, before receiving service traffic of the SFC computing network, the method further comprises:
  controlling the atomic function instance to be registered in an SFF of the SFC computing network; and/or
  controlling the atomic function instance to be deregistered from an SFF of the SFC computing network.

In another embodiment, the method further comprises:
  controlling the atomic function instance to be registered in the SFC computing network by one of:
  collecting information of the atomic function instance by means of an NFVO, and distributing the information of the atomic function instance to all SFFs, wherein the information of the atomic function instance comprises an atomic function identifier, node computing power information, a node address, a node anycast address and a uniform resources locator (URL) of a node computing power instance;
  controlling the atomic function instance to register information of the atomic function instance of the SFC computing network with an SFF, and flooding, by means of the SFF, the information of the atomic function instance to a neighboring SFF via a network protocol; and collecting information of the atomic function instance by means of the network function virtualization orchestrator (NFVO), distributing the information of the atomic function instance to some of SFFs, and flooding, by means of the some of SFFs, the information of the atomic function instance to neighboring SFFs via a network protocol.

In another embodiment, the method further comprises:

receiving indication information for adding, deleting and/or modifying the mapping relationship between an atomic function identifier and a plurality of atomic function instances in the SFC forwarding table; and updating the mapping relationship between an atomic function identifier and a plurality of atomic function instances in the SFC forwarding table according to the indication information.

In the present embodiment, the atomic function identifier comprises an anycast address and a uniform resources locator (URL).

According to another embodiment of the present disclosure, further provided is a service traffic processing apparatus, applied to a service function forwarder (SFF), comprising:

a first receiving module, configured to receive service traffic of a service function chain (SFC) computing network;

a first determination module, configured to determine an atomic function identifier of the service traffic;

a second determination module, configured to determine, according to a pre-stored SFC forwarding table, a first atomic function instance corresponding to the atomic function identifier, wherein the SFC forwarding table comprises a mapping relationship between an atomic function identifier and a plurality of atomic function instances; and a first forwarding module, configured to forward the service traffic to the first atomic function instance, wherein the first atomic function instance is used for processing the service traffic.

In an embodiment, the first determination module comprises:

a first parsing sub-module, configured to parse a network service header (NSH) of the service traffic; and a second parsing sub-module, configured to parse out the atomic function identifier of a next atomic function instance according to a service path identifier (SPI) and a service index (SI).

In another embodiment, the apparatus further comprises:

a second receiving module, configured to receive the service traffic returned by the atomic function instance after subtracting 1 from the SI;

a first parsing module, configured to parse a network service header (NSH) of the service traffic;

a second parsing module, configured to parse out a next atomic function identifier according to the SPI and the SI;

a third determination module, configured to determine, according to the pre-stored SFC forwarding table, a second atomic function instance corresponding to the next atomic function identifier; and a second forwarding module, configured to forward the service traffic according to the second atomic function instance.

In another embodiment, the second forwarding module comprises:

a determination sub-module, configured to determine an SFF corresponding to the second atomic function instance;

a first forwarding sub-module, configured to locally forward the service traffic in the case where the second atomic function instance corresponds to the first SFF; and a second forwarding sub-module, configured to forward the service traffic to a second SFF in the case where the second atomic function instance corresponds to the second SFF.

In another embodiment, the apparatus further comprises:

a first control module, configured to control the atomic function instance to be registered in an SFF of the SFC computing network; and/or a second control module, configured to control the atomic function instance to be deregistered from an SFF of the SFC computing network.

In another embodiment, the first control module is further configured to control the atomic function instance to be registered in the SFC computing network by one of:

collecting information of the atomic function instance by means of an NFVO, and distributing the information of the atomic function instance to all SFFs, wherein the information of the atomic function instance comprises an atomic function identifier, node computing power information, a node address, a node any cast address and a uniform resource locator (URL) of a node computing power instance;

controlling the atomic function instance to register information of the atomic function instance of the SFC computing network with an SFF, and flooding, by means of the SFF, the information of the atomic function instance to a neighboring SFF via a network protocol; and collecting information of the atomic function instance by means of the NFVO, distributing the information of the atomic function instance to some of SFFs, and flooding, by means of the some of SFFs, the information of the atomic function instance to neighboring SFFs via a network protocol.

In another embodiment, the apparatus further comprises:

a third receiving module, configured to receive indication information for adding, deleting and/or modifying the mapping relationship between an atomic function identifier and a plurality of atomic function instances in the SFC forwarding table; and an updating module, configured to update the mapping relationship between an atomic function identifier and a plurality of atomic function instances in the SFC forwarding table according to the indication information.

In the present embodiment, the atomic function identifier comprises an anycast address and a uniform resource locator (URL).

According to still another embodiment of the present disclosure, further provided is a computer-readable storage medium, the computer-readable storage medium storing a computer program therein, wherein the computer program is configured to execute the steps in any one of the described method embodiments when running.

According to still another embodiment of the present disclosure, further provided is an electronic device, comprising a memory and a processor, wherein the memory stores a computer program therein, and the processor is configured to run the computer program so as to execute the steps in any one of the described method embodiments.

In the present disclosure, with regard to an SFC computing network, an atomic function is abstracted into an atomic function identifier, an atomic function instance corresponding to the atomic function identifier is determined by means of a forwarding table containing a plurality of atomic function instances corresponding to the atomic function identifier, and service traffic is forwarded according to the determined atomic function instance. In this way, the present disclosure can solve the problem that current network messages and flow processing mechanisms are not applicable to a computing network due to the situation in the related art where a current SFF is bound to a network L2 or L3 address, while in a computing network, a computing power SF is highly dynamic, and the same SF corresponds to a plurality of atomic function instances. By means of abstraction of a service function in an SFC computing network, dynamic multi-instance of the computing power atomic function is supported, thereby implementing processing of the computing network service traffic in an SFC mechanism.

DETAILED DESCRIPTION OF THE EMBODIMENTS

Hereinafter, the embodiments of the present disclosure will be described in detail with reference to the drawings and in conjunction with the embodiments.

It should be noted that, terms such as "first" and "second" in the description and the claims of the present disclosure and the described drawings are used to distinguish similar objects, but are not necessarily used to describe a specific sequence or order.

Figure 1:
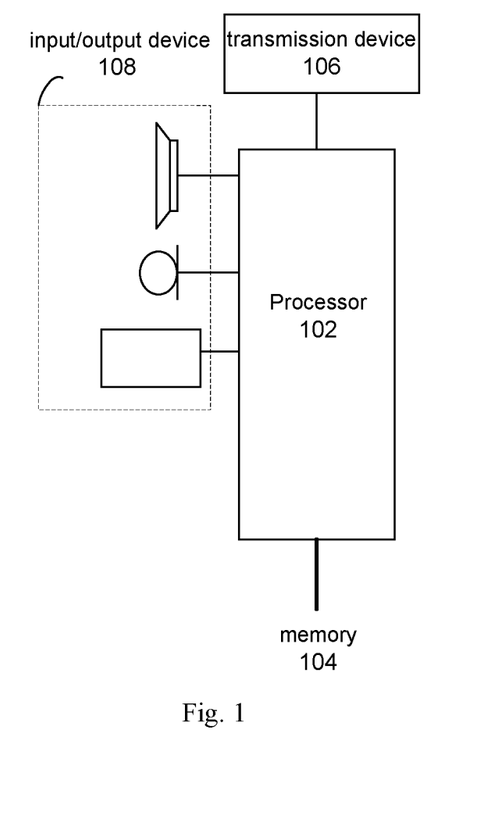
FIG. 1 is a hardware structure block diagram of a mobile terminal of a service traffic processing method according to an embodiment of the present disclosure.

The method embodiments provided in the embodiments of the present disclosure may be implemented in a mobile terminal, a computer terminal, or a similar computing apparatus. By taking running on a mobile terminal as an example, FIG. 1 is a hardware structure block diagram of a mobile terminal of a service traffic processing method according to an embodiment of the present disclosure. As shown in FIG. 1, the mobile terminal may comprise one or more (only one is shown in FIG. 1) processors 102 (the processors 102 may include but are not limited to processing apparatuses such as a micro controller unit (MCU) or a field-programmable gate array (FPGA)) and a memory 104 for storing data, wherein the mobile terminal may further comprise a transmission device 106 for a communication function and an input/output device 108. A person of ordinary skill in the art may understand that the structure shown in FIG. 1 is merely exemplary, which does not limit the structure of the mobile terminal. For example, the mobile terminal may further comprise components more or less than that shown in FIG. 1, or have a configuration different from that shown in FIG. 1.

The memory 104 may be configured to store a computer program, for example, a software program and a module of application software, such as a computer program corresponding to the service traffic processing method in the embodiment of the present disclosure. The processor 102 runs the computer program stored in the memory 104, so as to execute various function applications and data processing, i.e. implement the described method. The memory 104 may comprise a high-speed random access memory, and may also comprise a non-volatile memory, such as one or more magnetic storage apparatuses, flash memory, or other non-volatile solid-state memory. In some examples, the memory 104 may further comprise a memory configured remotely relative to the processor 102, and the remote memory may be connected to the mobile terminal over a network. Examples of the described network include, but are not limited to, the Internet, intranets, local area networks, mobile communication networks, and combinations thereof.

The transmission device 106 is configured to receive or transmit data via a network. Specific examples of the described network may include a wireless network provided by a communication provider of the mobile terminal. In an example, the transmission device 106 may comprise a network interface controller (NIC) that may be connected to other network devices via a base station to communicate with the Internet. In an example, the transmission device 106 may be a radio frequency (RF) module configured to communicate wirelessly with the Internet.

Figure 2:
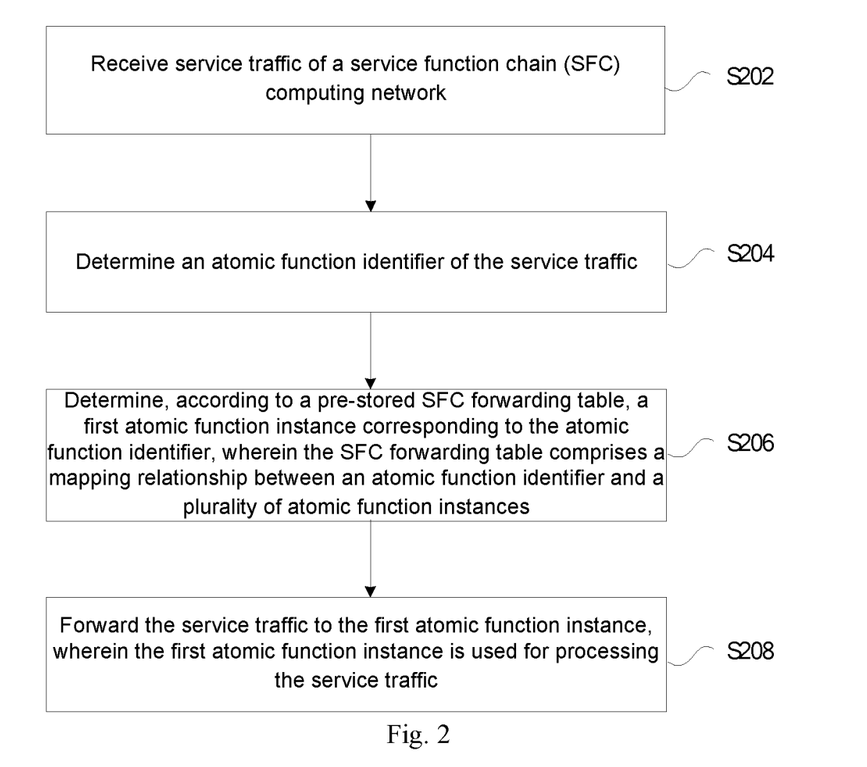
FIG. 2 is a flowchart of a service traffic processing method according to an embodiment of the present disclosure.

Provided in the present embodiment is a service traffic processing method running on the described mobile terminal or network architecture. FIG. 2 is a flowchart of a service traffic processing method according to an embodiment of the present disclosure. As shown in FIG. 2, the method is applied to a first SFF, and the flow comprises the following steps:

step S202 comprises receiving service traffic of a service function chain (SFC) computing network.

In the present embodiment, a computing network needs to directly match a specific application or service with a computing power node optimally matched therewith, and route corresponding service traffic, which requires the network to perform collaborative optimization routing on service traffic according to the network and computing power resources, and a routing decision-making flow needs the direct participation of application information. In practical deployments, it is impossible for the network to identify all the upper layer applications, and therefore it is necessary to decompose an application into a combination of some basic atomic functions, such as Fourier transform, matrix operation, and encoding and decoding algorithms, and the network layer performs optimal computing powder matching on these atomic functions and performs corresponding routing decision-making.

Step S204 comprises determining an atomic function identifier of the service traffic.

In the present embodiment, the atomic function identifier comprises an anycast address and a uniform resources locator (URL).

In an embodiment, step S204 may specifically comprise: parsing a network service header (NSH) of the service traffic; and parsing out the atomic function identifier of a next atomic function instance according to a service path identifier (SPI) and a service index (SI).

Step S206 comprises determining, according to a pre-stored SFC forwarding table, a first atomic function instance corresponding to the atomic function identifier, wherein the SFC forwarding table comprises a mapping relationship between an atomic function identifier and a plurality of atomic function instances.

The SFC forwarding table in the embodiments of the present disclosure comprises a plurality of groups of mapping relationships, and each group of mapping relationships is a correlation between an atomic function identifier and a plurality of atomic function instances.

Step S208 comprises forwarding the service traffic to the first atomic function instance, wherein the first atomic function instance is used for processing the service traffic.

In steps S202 to S208, with regard to an SFC computing network, an atomic function is abstracted into an atomic function identifier, an atomic function instance corresponding to the atomic function identifier is determined by means of a forwarding table containing a plurality of atomic function instances corresponding to the atomic function identifier, and service traffic is forwarded according to the determined atomic function instance. In this way, the present disclosure can solve the problem that current network messages and flow processing mechanisms are not applicable to a computing network due to the situation in the related art where a current SFF is bound to a network L2 or L3 address, while in a computing network, a computing power SF is highly dynamic, and the same SF corresponds to a plurality of atomic function instances. By means of abstraction of a service function in an SFC computing network, dynamic multi-instance of the computing power atomic function is supported, thereby implementing processing of the computing network service traffic in an SFC mechanism.

In an embodiment, after forwarding the service traffic to the first atomic function instance, the service traffic returned by the atomic function instance after subtracting 1 from the SI is received, and a network service header (NSH) of the service traffic is parsed; a next atomic function identifier is parsed out according to the SPI and the SI; a second atomic function instance corresponding to the next atomic function identifier is determined according to a pre-stored SFC forwarding table, and the service traffic is forwarded according to the second atomic function instance. Furthermore, a first SFF determines an SFF corresponding to the second atomic function instance; in the case where the second atomic function instance corresponds to the first SFF, the first SFF locally forwards the service traffic, wherein the atomic function instance and the current SFF are located at the same address prefix or the same network segment; and in the case where the second atomic function instance corresponds to a second SFF, the first SFF forwards the service traffic to the second SFF, that is, the network segment and the address prefix corresponding to the second atomic function instance are both different from the current SFF and belong to another SFF, i.e. the second SFF.

In another embodiment, before receiving service traffic of the SFC computing network, the atomic function instance is controlled to be registered in an SFF of the SFC computing network. Furthermore, the atomic function instance can be controlled to be registered in the SFC computing network by one of: collecting information of the atomic function instance by means of an NFVO, and distributing the information of the atomic function instance to all SFFs, wherein the information of the atomic function instance comprises an atomic function identifier, node computing power information, a node address, a node anycast address and a URL of a node computing power instance; controlling the atomic function instance to register information of the atomic function instance of the SFC computing network with an SFF, and flooding, by means of the SFF, the information of the atomic function instance to a neighboring SFF via a network protocol; collecting information of the atomic function instance by means of the NFVO, distributing the information of the atomic function instance to some of SFFs, and flooding, by means of the some of SFFs, the information of the atomic function instance to neighboring SFFs via a network protocol; and/or controlling the atomic function instance to be deregistered from an SFF of the SFC computing network.

In another embodiment, the SFC forwarding table may also be updated. Specifically, indication information for adding, deleting and/or modifying the mapping relationship between an atomic function identifier and a plurality of atomic function instances in the SFC forwarding table is received; and the mapping relationship between an atomic function identifier and a plurality of atomic function instances in the SFC forwarding table is updated according to the indication information.

In the embodiments of the present disclosure, on the basis of a computing network orchestration and forwarding mechanism of a service function chain (SFC), the SFC implements logic orchestration for a service via a service function path (SFP), and identifies, via a service path identifier (SPI) and a service index (SI), a next hop processing function node of service traffic; and a service function forwarder (SFF) is responsible for maintaining an SFC forwarding table, and forwarding the service traffic to a service function (SF) and a neighboring SFF. In a computing network scenario, the described atomic function instance is an SF, but the atomic function herein is a virtualized instance in many scenarios and can be dynamically migrated, and the instance of the same atomic function is not unique. In the current SFC mechanism, an SF instance is tightly coupled to network L2 & L3 addresses, and for an atomic function dynamic multi-instance scenario of a computing network, an extension mechanism of the SFC needs to be designed to support decoupling of the SF from the network L2 & L3 addresses.

Figure 3:
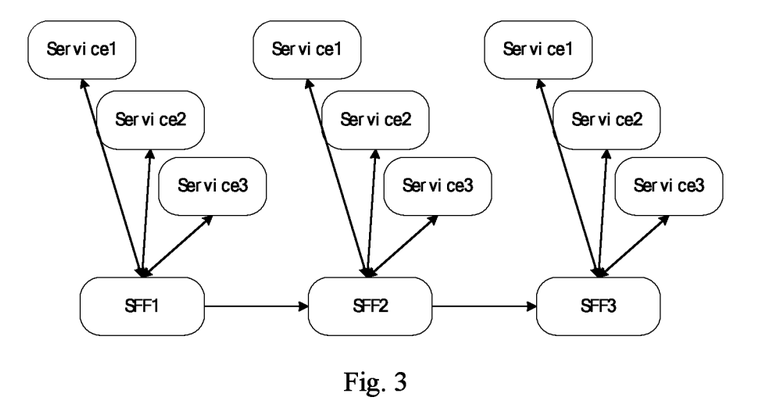
FIG. 3 is a schematic diagram of SFFs and atomic function instances according to the present embodiment.

Specifically, the SFF needs to support an anycast address of the SF, that is, in an SF forwarding table maintained by the SFF, a plurality of instances of a computing network atomic function are associated via an anycast address, and the exiting, modification and updating of a member atomic function instance, and the joining of a new member atomic function instance are supported. FIG. 3 is a schematic diagram of SFFs and atomic function instances according to the present embodiment. As shown in FIG. 3, a plurality of instances of the same atomic function may belong to one SFF, and may also span over a plurality of SFFs.

The SFF maintains a mapping relationship between the same atomic function (or atomic service) and an anycast address and member instances, and forwards, according to the principle of proximity, service traffic to a corresponding atomic function instance node for processing. If the corresponding atomic function instance belongs to the SFF where it is located, the SFF performs local forwarding, and if the corresponding atomic function instance belongs to another SFF, the SFF performs cross-SFF forwarding. Registration and deregistration of a computing network atomic function instance over the SFC network may be performed in the following three manners:

an NFVO centralized collects and centralized distributes information, comprising an atomic function identifier, node computing power information, a node address, a node anycast address, etc., of a computing network atomic function instance.

Figure 4:
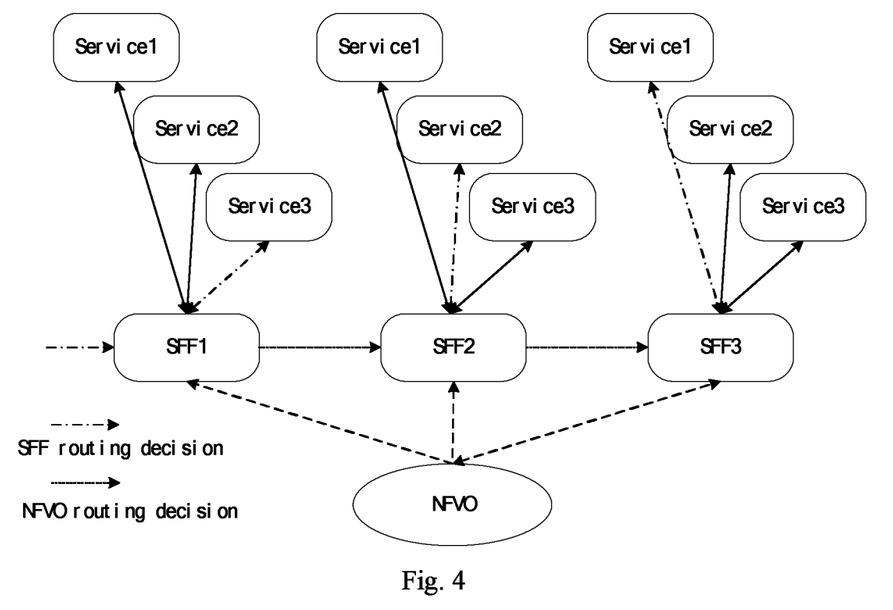
FIG. 4 is a second schematic diagram of SFFs and atomic function instances according to the present embodiment.

FIG. 4 is a second schematic diagram of SFFs and atomic function instances according to the present embodiment. As shown in FIG. 4, an NFVO performs global management, comprising information collection, orchestration and routing planning, on information of a computing network atomic function to which an SFF belongs in a centralized mode; and the SFF performs local management, comprising information collection and routing, on the information of the computing network atomic function.

The information, comprising an atomic function identifier, node computing power information, a node address, a node anycast address, etc., of a computing network atomic function instance is registered in and deregistered from the SFF. The SFF floods information of a local computing network atomic function SF to a neighboring SFF node via IGP & BGP protocols, so as to implement network-wide notification of the state of a computing network atomic function node.

Figure 5:
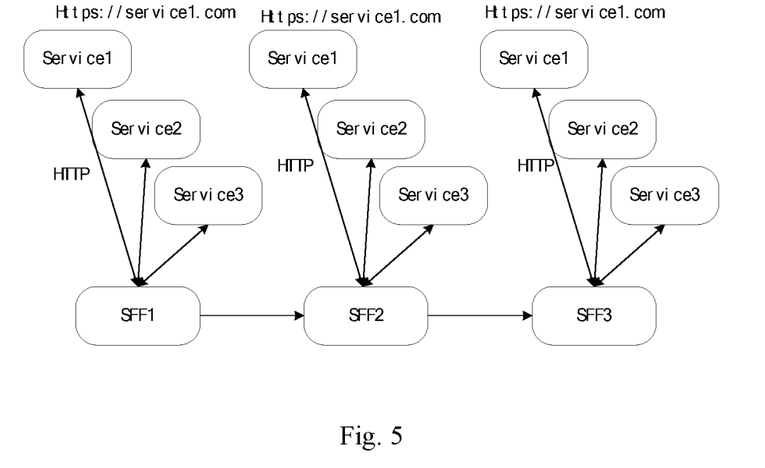
FIG. 5 is a third schematic diagram of SFFs and atomic function instances according to the present embodiment.

FIG. 5 is a third schematic diagram of SFFs and atomic function instances according to the present embodiment. As shown in FIG. 5, in particular, the SFF also needs to support an SF identifier based on a uniform resources locator (URL), so that a URL of one SF is associated with a plurality of computing network atomic function instances. For example, the identifier of a computing network atomic function (SF) is https://atomservice1.com, a plurality of instances and addresses thereof can be associated, and the SFF parses a returned IP address via a DNS, and determines a forwarding destination of service traffic according to computing power information of each computing network atomic function instance node.

The SFF maintains a computing network atomic function SF information table. Registration and deregistration of a computing network atomic function instance over the SFC network may be performed in the following three manners:

an NFVO centralizedly collects and centralizedly distributes information, comprising an atomic function identifier, i.e. URL, computing power information corresponding to an atomic function, node computing power information, a node address, etc., of a computing network atomic function.

An NFVO performs global management, comprising information collection, orchestration and routing planning, on information of a computing network atomic function to which an SFF belongs in a centralized mode; and the SFF performs local management, comprising information collection and routing, on the information of the computing network atomic function, as shown in FIG. 4.

The information, comprising an atomic function identifier, i.e. URL, computing power information corresponding to an atomic function, node computing power information, a node address, etc., of a computing network atomic function instance is registered in and deregistered from the SFF. The SFF floods information of a local computing network atomic function SF to a neighboring SFF node via IGP & BGP protocols, so as to implement network-wide notification of the state of a computing network atomic function node.

Figure 6:
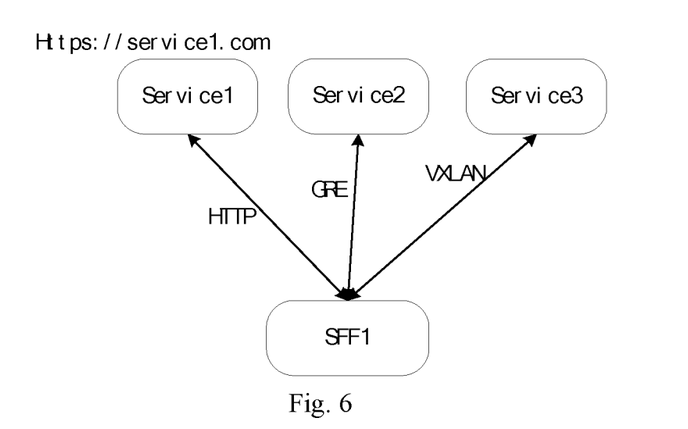
FIG. 6 is a schematic diagram of SFF supported extension according to the present embodiment.

FIG. 6 is a schematic diagram of SFF supported extension according to the present embodiment. As shown in FIG. 6, a computing power atomic function is identified by a URL and is associated with a plurality of instance nodes, and the SFF needs to be extended as follows:

1. supporting parsing of a URL message, HTTP encapsulation and forwarding;
2. supporting TCP link establishment and maintenance;
3. supporting the maintenance of a triplet (service ID, Service TE (transport encapsulation, i.e. HTTP) and SFF ID) for a computing power atomic function Service; and
4. supporting the maintenance of URL-based computing power atomic function Service table entries.

Figure 7:
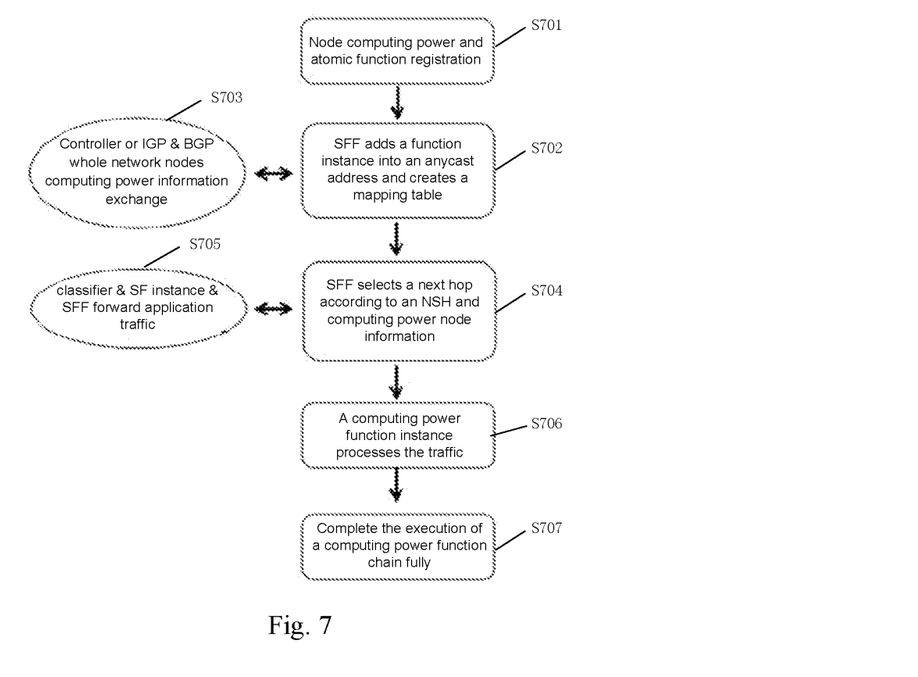
FIG. 7 is a first flowchart of service traffic forwarding processing of an SFC computing network according to the present embodiment.

FIG. 7 is a first flowchart of service traffic forwarding processing of an SFC computing network according to the present embodiment. As shown in FIG. 7, a service traffic forwarding processing flow of an SFC computing network based on a Service Function being an anycast address comprises:

step S701, node computing power and atomic function registration;

step S702, an SFF adding a function instance into an anycast address and creating a mapping table;

step S703, controller or interior gateway protocol (IGP) and border gateway protocol (BGP) whole network nodes computing power information exchange;

step S704, the SFF selecting a next hop according to an NSH and computing power node information;

step S705, a classifier and an SF instance and the SFF forwarding service traffic;

step S706, a computing power function instance processing the service traffic; and step S707, completing the execution of a computing power function chain fully.

The SFC network performs SFP orchestration on the basis of a Service Function being an anycast address, that is, one SF is associated with a plurality of different computing network atomic function (service) instances. Computing power information registration and deregistration of each instance node of the computing network atomic function are achieved in two modes, i.e. NFVO centralized management or SFF local management based on IGP & BGP protocols. Thus, the SFF can maintain entries such as a computing network atomic function (service) SF, an SF instance node address, computing power information and an anycast address.

The service traffic passes through a classifier of an SFC network, and the classifier routes a service traffic request to an ingress SFF; the ingress SFF parses a network service header (NSH), and parses out an anycast address of a next computing network atomic function according to a combination of an SPI and an SI; the ingress SFF forwards the service traffic to a corresponding computing network atomic function instance node according to the anycast address and the principle of proximity; the corresponding computing network atomic function instance node performs corresponding processing on the service traffic, and subtracts 1 from the SI, and returns the service traffic to the corresponding SFF; the SFF parses the NSH, and parses out an anycast address of a next computing network atomic function according to the combination of the SPI and the SI; if the optimal instance node is located locally, local forwarding is performed, and if the optimal instance node is in another SFF control domain, the service traffic is forwarded to the corresponding SFF node, the NSH also needs to be parsed in the latter case, and the processing mechanism is as the same as the previous SFF; and the service traffic is forwarded to the optimal instance of the last computing network atomic function, thus finishing all the atomic function processing required by an application.

Figure 8:
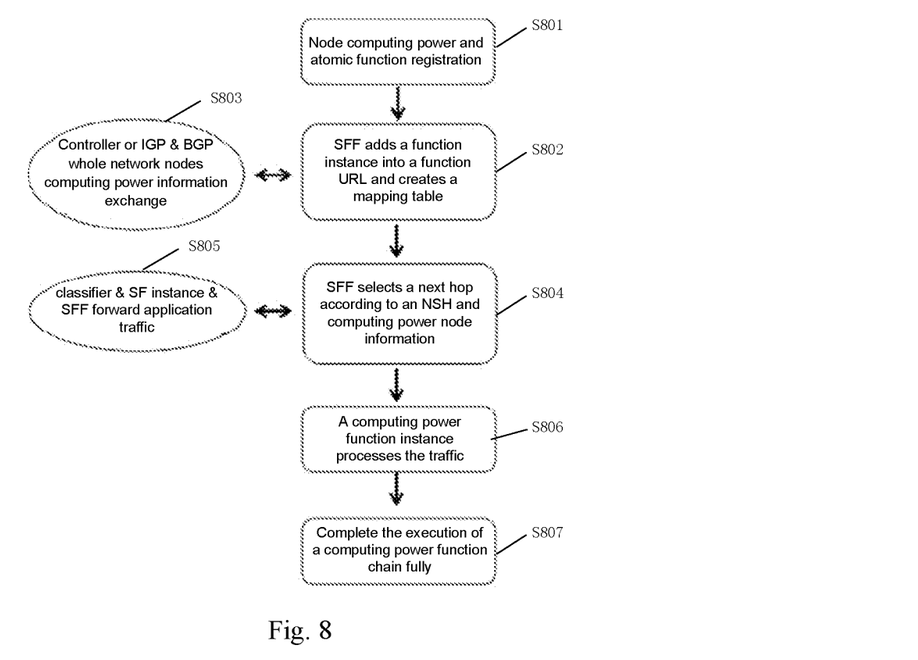
FIG. 8 is a second flowchart of service traffic forwarding processing of an SFC computing network according to the present embodiment.

FIG. 8 is a second flowchart of service traffic forwarding processing of an SFC computing network according to the present embodiment. As shown in FIG. 8, a service traffic forwarding processing flow of an SFC computing network based on a Service Function being a URL comprises:

step S801, node computing power and atomic function registration;

step S802, an SFF adding a function instance into a function URL and creating a mapping table;

step S803, controller or IGP and BGP whole network nodes computing power information exchange;

step S804, the SFF selecting a next hop according to an NSH and computing power node information;

step S805, a classifier and an SF instance and the SFF forwarding service traffic;

step S806, a computing power function instance processing the service traffic; and step S807, completing the execution of a computing power function chain fully.

The SFC network performs SFP orchestration on the basis of a Service Function being an URL, that is, one SF is associated with a plurality of different computing network atomic function (service) instances. Computing power information registration and deregistration of each instance node of the computing network atomic function are achieved in two modes, i.e. NFVO centralized management or SFF local management based on IGP & BGP protocols. Thus, the SFF can maintain entries such as a computing network atomic function (service) SF URL, an SF instance node address, and computing power information.

The service traffic passes through a classifier of an SFC network, and the classifier routes a service traffic request to an ingress SFF; the ingress SFF parses a network service header (NSH), and parses out a URL of a next computing network atomic function according to a combination of an SPI and an SI; according to the address of the computing network atomic function URL parsed by a DNS, the service traffic is forwarded to an optimal computing network atomic function instance node by means of an HPPT request, and a corresponding TCP link is maintained; the corresponding computing network atomic function instance node performs corresponding processing on the service traffic, and subtracts 1 from the SI, and returns the service traffic to the corresponding SFF by means of an HTTP request, and if the corresponding TCP link is valid, forwarding is performed by means of the existing link, otherwise a new TCP link is established and the service traffic is forwarded back to the SFF by means of the new link; the SFF parses the NSH, and parses out a URL of a next computing network atomic function according to the combination of the SPI and the SI; if the optimal instance node is located locally, local forwarding is performed, and if the optimal instance node is in another SFF control domain, the service traffic is forwarded to the corresponding SFF node, the NSH also needs to be parsed in the latter case, and the processing mechanism is as the same as the previous SFF; and the service traffic is forwarded to the optimal instance of the last computing network atomic function, thus finishing all the atomic function processing required by an application.

From the description of the foregoing embodiments, a person skilled in the art may clearly understand that the method according to the foregoing embodiments may be implemented by software and a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and comprises several instructions for causing a terminal device (which may be a mobile phone, a computer, a server, or a network device) to execute the method described in the embodiments of the present disclosure.

Further provided in the present embodiment is a service traffic processing apparatus, which is configured to implement the described embodiment and preferred example, and what has been described will not be described herein again. The term "module", as used hereinafter, is a combination of software and/or hardware capable of realizing a predetermined function. Although the apparatus described in the following embodiment is preferably implemented by software, implementation by hardware or a combination of software and hardware is also possible and conceived.

Figure 9:
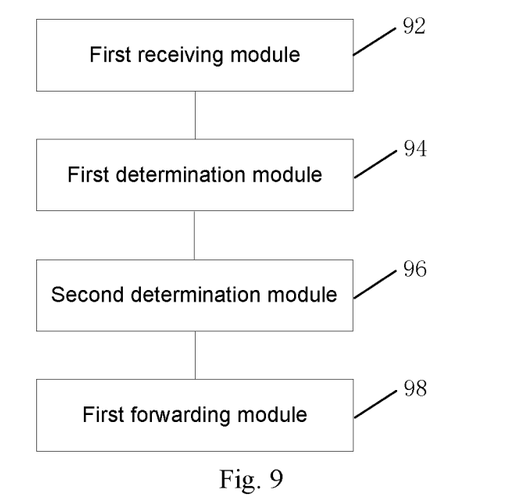
FIG. 9 is a structure block diagram of a service traffic processing apparatus according to an embodiment of the present disclosure.

FIG. 9 is a structure block diagram of a service traffic processing apparatus according to an embodiment of the present disclosure. As shown in FIG. 9, the apparatus is applied to a first SFF, and comprises:

a first receiving module 92, configured to receive service traffic of a service function chain (SFC) computing network;

a first determination module 94, configured to determine an atomic function identifier of the service traffic;

a second determination module 96, configured to determine, according to a pre-stored SFC forwarding table, a first atomic function instance corresponding to the atomic function identifier, wherein the SFC forwarding table comprises a mapping relationship between an atomic function identifier and a plurality of atomic function instances; and a first forwarding module 98, configured to forward the service traffic to the first atomic function instance, wherein the first atomic function instance is used for processing the service traffic.

In an embodiment, the first determination module 94 comprises:

a first parsing sub-module, configured to parse a network service header (NSH) of the service traffic; and a second parsing sub-module, configured to parse out the atomic function identifier of a next atomic function instance according to a service path identifier (SPI) and a service index (SI).

In another embodiment, the apparatus further comprises:

a second receiving module, configured to receive the service traffic returned by the atomic function instance after subtracting 1 from the SI;

a first parsing module, configured to parse a network service header (NSH) of the service traffic;

a second parsing module, configured to parse out a next atomic function identifier according to the SPI and the SI;

a third determination module, configured to determine, according to the pre-stored SFC forwarding table, a second atomic function instance corresponding to the next atomic function identifier; and a second forwarding module, configured to forward the service traffic according to the second atomic function instance.

In another embodiment, the second forwarding module comprises:
- a determination sub-module, configured to determine an SFF corresponding to the second atomic function instance;
- a first forwarding sub-module, configured to locally forward the service traffic in the case where the second atomic function instance corresponds to the first SFF; and
- a second forwarding sub-module, configured to forward the service traffic to a second SFF in the case where the second atomic function instance corresponds to the second SFF.

In another embodiment, the apparatus further comprises:
- a first control module, configured to control the atomic function instance to be registered in an SFF of the SFC computing network; and/or
- a second control module, configured to control the atomic function instance to be deregistered from an SFF of the SFC computing network.

In another embodiment, the first control module is further configured to control the atomic function instance to be registered in the SFC computing network by one of:
- collecting information of the atomic function instance by means of an NFVO, and distributing the information of the atomic function instance to all SFFs, wherein the information of the atomic function instance comprises an atomic function identifier, node computing power information, a node address, a node anycast address and a URL of a node computing power instance;
- controlling the atomic function instance to register information of the atomic function instance of the SFC computing network with an SFF, and flooding, by means of the SFF, the information of the atomic function instance to a neighboring SFF via a network protocol; and collecting information of the atomic function instance by means of the NFVO, distributing the information of the atomic function instance to some of SFFs, and flooding, by means of the some of SFFs, the information of the atomic function instance to neighboring SFFs via a network protocol.

In another embodiment, the apparatus further comprises:
- a third receiving module, configured to receive indication information for adding, deleting and/or modifying the mapping relationship between an atomic function identifier and a plurality of atomic function instances in the SFC forwarding table; and
- an updating module, configured to update the mapping relationship between an atomic function identifier and a plurality of atomic function instances in the SFC forwarding table according to the indication information.

In the present embodiment, the atomic function identifier comprises an anycast address and a uniform resources locator (URL).

It should be noted that the described various module may be implemented by software or hardware. The latter may be implemented in the following manner, but is not limited thereto: all the modules are located in the same processor; or the various modules are located in different processors in arbitrary combinations.

The embodiments of the present disclosure further provide a computer-readable storage medium, the computer-readable storage medium storing a computer program therein, wherein the computer program is configured to execute the steps in any one of the described method embodiments when running.

In an exemplary embodiment, the computer-readable storage medium may comprise, but is not limited to, any medium that can store a computer program, such as a USB flash disk, a read-only memory (ROM), a random access memory (RAM), a mobile hard disk, a magnetic disk, or an optical disk.

The embodiments of the present disclosure further provide an electronic device, comprising a memory and a processor, wherein the memory stores a computer program therein, and the processor is configured to run the computer program so as to execute the steps in any of the described method embodiments.

In an exemplary embodiment, the electronic device may further comprise a transmission device and an input/output device, wherein the transmission device is connected to the processor, and the input/output device is connected to the processor.

For specific examples in the present embodiment, reference may be made to the examples described in the foregoing embodiments and exemplary implementations, and details are not repeatedly described in the present embodiment.

Obviously, those skilled in the art should understand that various modules or various steps of the present disclosure can be implemented by a universal computing apparatus, and the various modules or steps can be integrated on a single computing apparatus or distributed over a network formed by a plurality of computing apparatuses, and can be implemented by program codes executable by the computing apparatus, so that the modules or steps can be stored in a storage apparatus and executed by the computing apparatus, and the shown or described steps can be executed in sequences different from those described here in some cases, or the various modules or steps can be implemented by manufacturing the modules or steps into various integrated circuit modules respectively, or manufacturing multiple modules or steps among the various modules or steps into a single integrated circuit module. Thus, the present disclosure is not limited to any specific combination of hardware and software.

The above description is only the preferred embodiments of the present disclosure, and is not intended to limit the present disclosure. For those skilled in the art, the present disclosure may have various modifications and variations. Any modifications, equivalent replacements, improvements and the like made within the principle of the present disclosure shall belong to the protection scope of the present disclosure.

What is claimed is:

1. A service traffic processing method, applied to a service function forwarder (SFF), comprising:
   receiving service traffic of a service function chain (SFC) computing network;
   determining an atomic function identifier of the service traffic;
   determining, according to a pre-stored SFC forwarding table, a first atomic function instance corresponding to the atomic function identifier, wherein the SFC forwarding table comprises a mapping relationship between an atomic function identifier and a plurality of atomic function instances; and
   forwarding the service traffic to the first atomic function instance, wherein the first atomic function instance is used for processing the service traffic;
   wherein before receiving service traffic of the SFC computing network, the method further comprises: controlling the atomic function instance to be registered in an SFF of the SFC computing network by one of:
collecting information of the atomic function instance by means of a network function virtualization orchestrator (NFVO), and distributing the information of the atomic function instance to all SFFs, wherein the information of the atomic function instance comprises an atomic function identifier, node computing power information, a node address, a node anycast address and a uniform resources locator (URL) of a node computing power instance;
controlling the atomic function instance to register information of the atomic function instance of the SFC computing network with an SFF, and flooding, by means of the SFF, the information of the atomic function instance to a neighboring SFF via a network protocol; and
collecting information of the atomic function instance by means of the NFVO, distributing the information of the atomic function instance to some of SFFs, and flooding, by means of the some of SFFs, the information of the atomic function instance to neighboring SFFs via a network protocol.

2. The method according to claim 1, wherein determining an atomic function identifier of the service traffic comprises:
parsing a network service header (NSH) of the service traffic; and
parsing out the atomic function identifier of a next atomic function instance according to a service path identifier (SPI) and a service index (SI).

3. The method according to claim 2, wherein after forwarding the service traffic to the first atomic function instance, the method further comprises:
receiving the service traffic returned by the atomic function instance after subtracting 1 from the SI;
parsing a network service header (NSH) of the service traffic;
parsing out a next atomic function identifier according to the SPI and the SI;
determining, according to the pre-stored SFC forwarding table, a second atomic function instance corresponding to the next atomic function identifier; and
forwarding the service traffic according to the second atomic function instance.

4. The method according to claim 3, wherein forwarding the service traffic according to the second atomic function instance comprises:
a first SFF determining an SFF corresponding to the second atomic function instance;
in the case where the second atomic function instance corresponds to the first SFF, the first SFF locally forwarding the service traffic; and
in the case where the second atomic function instance corresponds to a second SFF, the first SFF forwarding the service traffic to the second SFF.

5. An electronic device, comprising a memory and a processor, wherein the memory stores a computer program therein, and the processor is configured to run the computer program so as to execute the method as claimed in claim 4.

6. An electronic device, comprising a memory and a processor, wherein the memory stores a computer program therein, and the processor is configured to run the computer program so as to execute the method as claimed in claim 2.

7. A non-transitory computer-readable storage medium, the computer-readable storage medium storing a computer program therein, wherein the computer program is configured to execute the method as claimed in claim 2 when running.

8. An electronic device, comprising a memory and a processor, wherein the memory stores a computer program therein, and the processor is configured to run the computer program so as to execute the method as claimed in claim 3.

9. A non-transitory computer-readable storage medium, the computer-readable storage medium storing a computer program therein, wherein the computer program is configured to execute the method as claimed in claim 3 when running.

10. The method according to claim 1, wherein before receiving service traffic of the SFC computing network, the method further comprises:
controlling the atomic function instance to be deregistered from an SFF of the SFC computing network.

11. An electronic device, comprising a memory and a processor, wherein the memory stores a computer program therein, and the processor is configured to run the computer program so as to execute the method as claimed in claim 10.

12. The method according to claim 1, wherein the method further comprises:
receiving indication information for adding, deleting and/or modifying the mapping relationship between an atomic function identifier and a plurality of atomic function instances in the SFC forwarding table; and
updating the mapping relationship between an atomic function identifier and a plurality of atomic function instances in the SFC forwarding table according to the indication information.

13. An electronic device, comprising a memory and a processor, wherein the memory stores a computer program therein, and the processor is configured to run the computer program so as to execute the method as claimed in claim 12.

14. The method according to claim 1, wherein the atomic function identifier comprises an anycast address and a uniform resources locator (URL).

15. An electronic device, comprising a memory and a processor, wherein the memory stores a computer program therein, and the processor is configured to run the computer program so as to execute the method as claimed in claim 14.

16. A non-transitory computer-readable storage medium, the computer-readable storage medium storing a computer program therein, wherein the computer program is configured to execute the method as claimed in claim 1 when running.

17. An electronic device, comprising a memory and a processor, wherein the memory stores a computer program therein, and the processor is configured to run the computer program so as to execute the method as claimed in claim 1.

18. A service traffic processing apparatus, applied to a first service function forwarder (SFF), comprising a processor and a memory, wherein the processor is configured to execute the following program modules stored in a memory:
a first receiving module, configured to receive service traffic of a service function chain (SFC) computing network;
a first determination module, configured to determine an atomic function identifier of the service traffic;
a second determination module, configured to determine, according to a pre-stored SFC forwarding table, a first atomic function instance corresponding to the atomic function identifier, wherein the SFC forwarding table comprises a mapping relationship between an atomic function identifier and a plurality of atomic function instances; and a first forwarding module, configured to forward the service traffic to the first atomic function instance, wherein the first atomic function instance is used for processing the service traffic;

a first control module, configured to control the atomic function instance to be registered in an SFF of the SFC computing network by one of:

collecting information of the atomic function instance by means of a network function virtualization orchestrator (NFVO), and distributing the information of the atomic function instance to all SFFs, wherein the information of the atomic function instance comprises an atomic function identifier, node computing power information, a node address, a node anycast address and a uniform resources locator (URL) of a node computing power instance;

controlling the atomic function instance to register information of the atomic function instance of the SFC computing network with an SFF, and flooding, by means of the SFF, the information of the atomic function instance to a neighboring SFF via a network protocol; and collecting information of the atomic function instance by means of the NFVO, distributing the information of the atomic function instance to some of SFFs, and flooding, by means of the some of SFFs, the information of the atomic function instance to neighboring SFFs via a network protocol.

* * * * *